Figure 1:
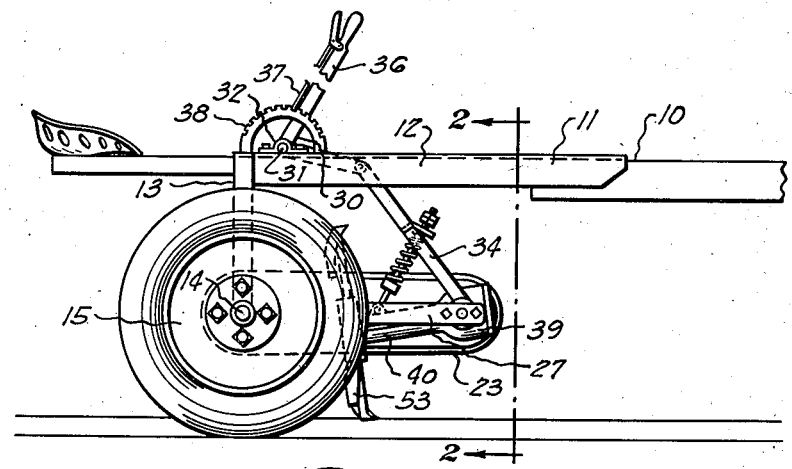

March 10, 1942.  L. W. LEEPER  2,275,446

AGRICULTURAL MACHINE

Filed Oct. 9, 1939  3 Sheets-Sheet 1

Inventor
Lawrence W. Leeper

By Jack A. Ashley

Attorney

March 10, 1942.    L. W. LEEPER    2,275,446
AGRICULTURAL MACHINE
Filed Oct. 9, 1939    3 Sheets-Sheet 2
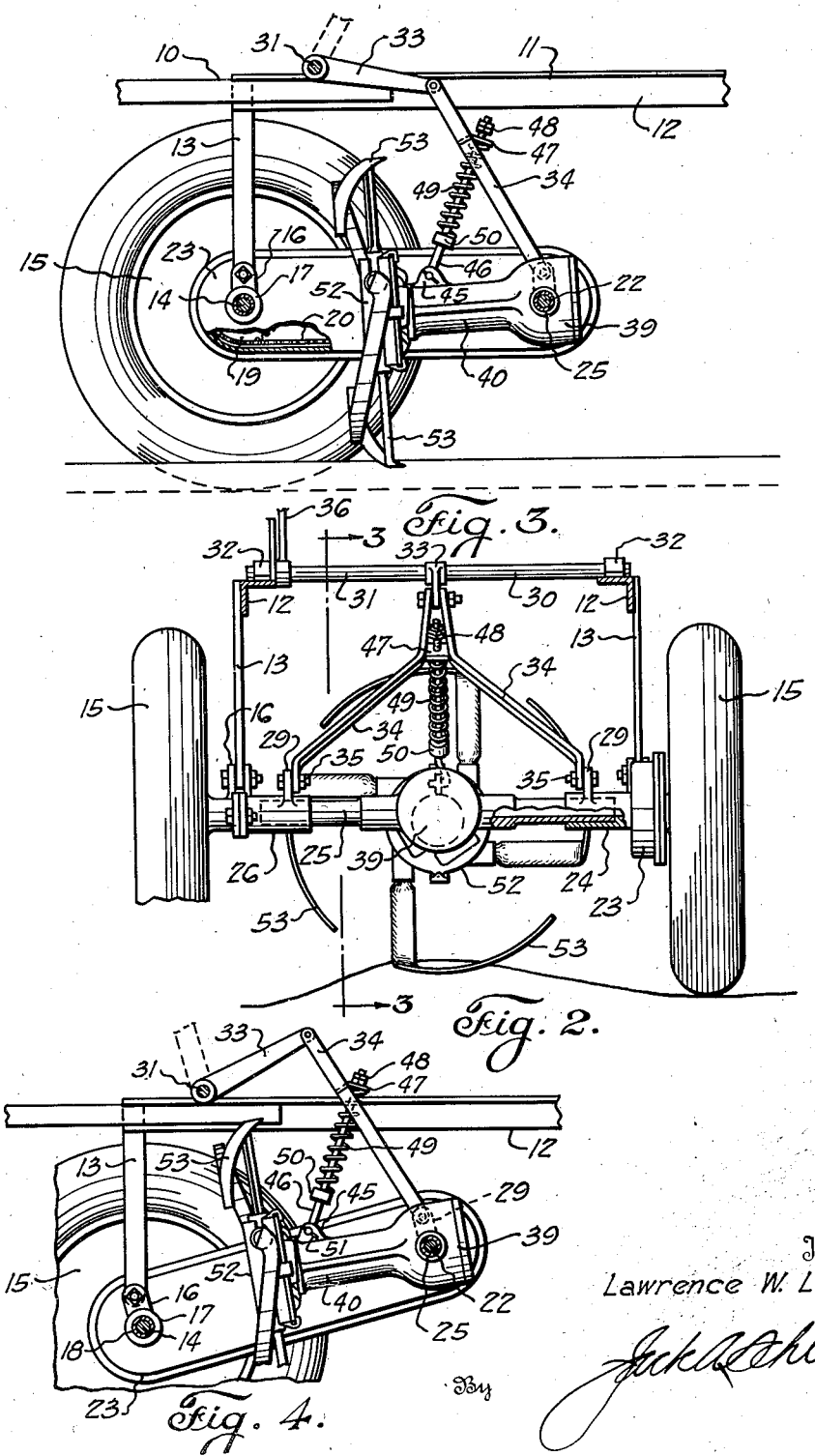
Inventor
Lawrence W. Leeper
By Jack A. Ashley
Attorney March 10, 1942.   L. W. LEEPER   2,275,446
AGRICULTURAL MACHINE
Filed Oct. 9, 1939   3 Sheets-Sheet 3
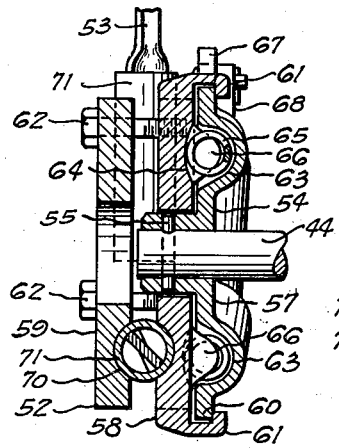
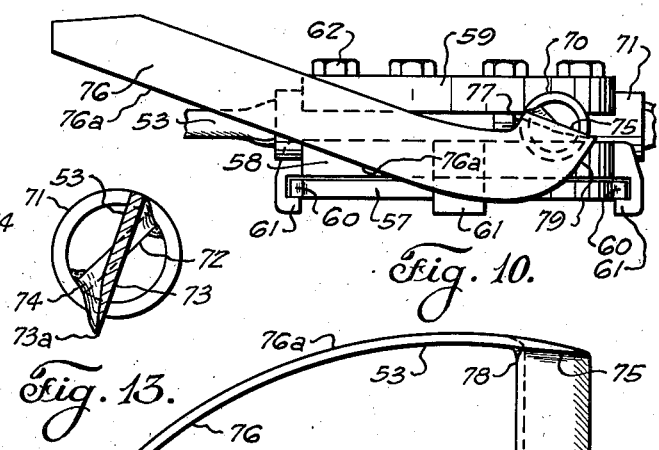
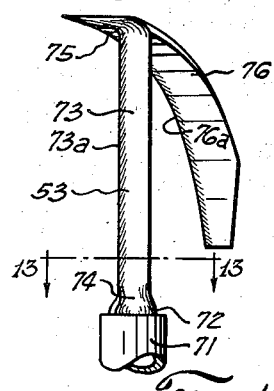
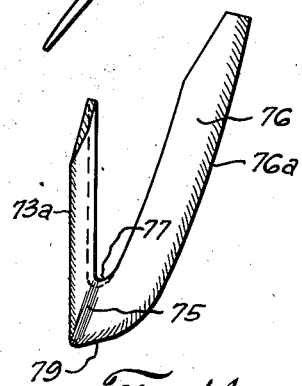
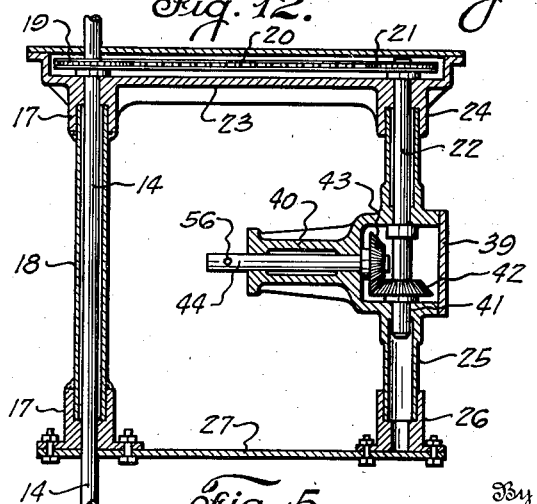
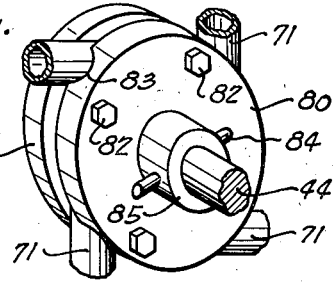
Inventor
Lawrence W. Leeper
By Jack A. Ashley
Attorney Patented Mar. 10, 1942

2,275,446

UNITED STATES PATENT OFFICE 2,275,446

AGRICULTURAL MACHINE

Lawrence W. Leeper, Dallas, Tex.

Application October 9, 1939, Serial No. 298,564

10 Claims. (Cl. 97—15)

This invention relates to new and useful improvements in agricultural machines.

One object of the invention is to provide an improved agricultural machine for thinning out or chopping crops planted in rows, such as young corn, sugar beets, cotton and other similar plants, which machine is adapted to remove a portion of the plants in a row without injuring the plants left standing, thereby promoting a more luxuriant and greater growth of said remaining plants, as well as earlier maturity thereof; the remaining plants being substantially evenly spaced.

An important object of the invention is to provide a crop spacing machine having an improved revolving chopper which is driven by the machine upon forward movement thereof, and is mounted upon said machine so as to be automatically released or disconnected whenever the revolving chopper encounters or engages an obstruction which offers resistance to the revolution of said chopper which might be injurious thereto.

Another object of the invention is to provide an improved revolving chopper having a plurality of cutters, each of which includes a more or less tangential arm and an arcuate circumferential blade constructed and disposed so that the blade is swung into engagement with the ground in such a manner as to enter the same with a minimum impact and to slice therethrough with a minimum drag, whereby undue disrupting of the soil and disturbing of the adjacent standing plants or their roots is prevented and thereby creating a moisture-retaining mulch between said standing plants.

Still another object of the invention is to provide a revolving chopper, of the character described, which is resiliently supported or mounted, the resilient mounting being adapted to absorb shocks incurred by the cutting elements of the chopper striking the ground as well as permitting disconnection of releasing of said chopper under certain conditions.

A particular object of the invention is to provide an improved machine, of the character described, wherein the revolving chopper is supported in operating position by a floating-suspension arrangement which permits a limited vertical movement of said chopper; there being resilient means provided for resisting upward vertical movement of the chopper and for counteracting the thrust of its driving mechanism, whereby said chopper is held in the proper cutting position during its operation irrespective of the contour of the earth being cultivated.

A further object of the invention is to provide an improved revolving chopper wherein the cutting elements are held rigidly in a set position, the adjustment of which may be varied, thereby making possible an increase or decrease of the width of the uncut portions of the rows, as well as varying the width of the swath cut by the blades.

A construction designed to carry out the invention will be hereinafter described, together with other features of the invention.

Figures 6, 7:
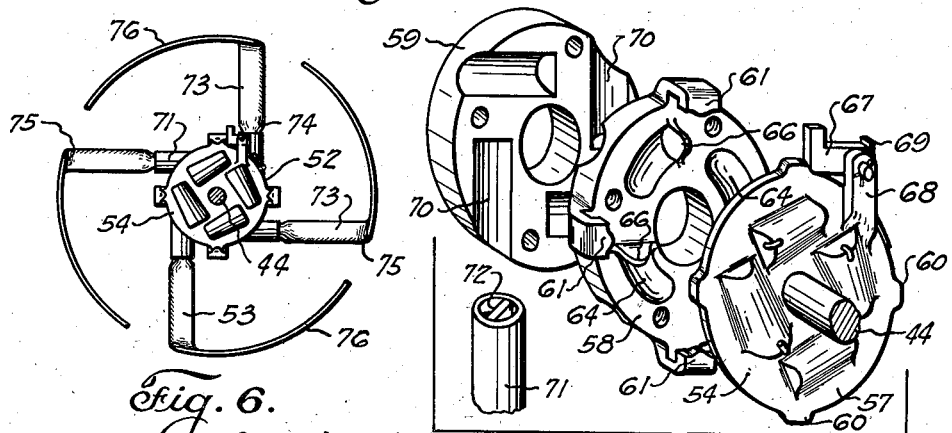
Figure 8:
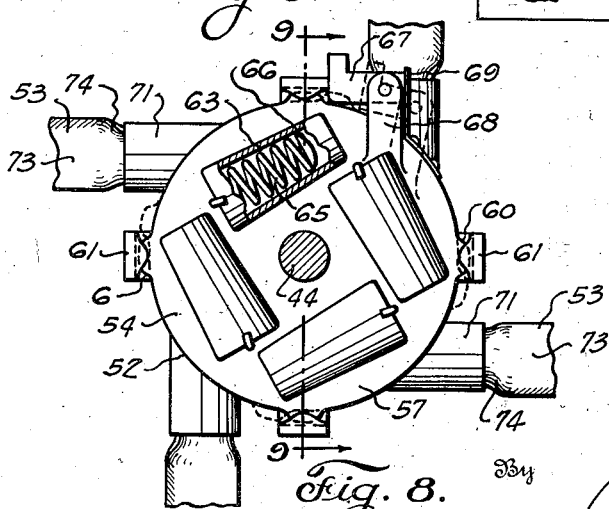

The invention will be more readily understood from a reading of the following specification and by reference to the accompanying drawings, in which an example of the invention is shown, and wherein:

Figure 1 is a side elevation of a crop spacing machine, constructed in accordance with the invention, and showing one of the blades of the revolving chopper engaging the ground, Figure 2 is an enlarged, transverse, vertical, sectional view, taken on the line 2—2 of Figure 1, Figure 3 is a vertical, sectional view, taken on the line 3—3 of Figure 2, with the chopper in its lower position, Figure 4 is a view, similar to Figure 3, showing the chopper in its raised position, Figure 5 is a horizontal, cross-sectional view of the driving mechanism, Figure 6 is an end elevation of the chopper, Figure 7 is an enlarged isometric view of the elements of the chopper hub in spaced relation to show the details thereof, Figure 8 is a view, partly in elevation and partly in section, of the hub, showing its releasing mechanism, Figure 9 is a transverse, vertical, sectional view, taken on the line 9—9 of Figure 8, Figure 10 is a plan view of the hub, showing the mounting of the cutting elements, Figure 11 is an enlarged elevation of one of the elements, Figure 12 is a similar view taken at a right angle to Figure 11, Figure 13 is a horizontal, cross-sectional view, taken on the line 13—13 of Figure 12, showing the twist of the arm of the element, Figure 14 is an isometric view of the outer portion of one of the cutting elements, showing the curved cutting edge formed at the juncture of the blade and arm thereof, and Figure 15 is an isometric view of a modified form of the hub.

In the drawings, the numeral 10 designates a crop spacing machine having the usual chassis 11 which includes a longitudinal frame 12, upright vertical braces 13, an axle 14 and wheels 15. The lower ends of the upright braces 13 are pivotally connected to upstanding lugs or ears 16 which are made integral with the tubular bearings 17 within which the axle is journaled, as is clearly shown in Figures 1 to 5. A protecting sleeve 18 engages and is rigidly secured within the inner ends of the bearings 17 so as to surround the axle 14. A suitable gear 19 is carried by one end of the axle between its left-hand wheel and bearing and is connected by an endless chain 20 to a similar forwardly disposed gear 21 mounted upon a short transverse shaft 22, as shown in Figure 5. Thus, the gear 21 and shaft 22 are rotated whenever the wheels 15, axle 14 and gear 19 are turned by movement of the machine, and said elements, obviously, revolve in the same direction due to the chain drive.

The gears 19 and 21 and the chain 20 are housed within a suitable elongated casing 23 which is made integral with the left-hand bearing 17 and which extends forwardly therefrom. A bearing collar 24, similar to the bearing 17, is formed at the forward end of the casing for reception of the shaft 22. An elongate, cylindrical housing 25 surrounds the shaft and projects beyond the inner end thereof so as to engage within a bearing collar 26 which is connected to the right-hand bearing 17 by a longitudinal bar 27 and suitable bolts and nuts. The opposite end of the housing 25, of course, engages within the collar 24, whereby said housing is supported by the collars and is freely rotatable with relation thereto.

The collars 24 and 26 are each provided with an upstanding lug or ear 29, whereby a lifting assembly 30 for raising and lowering the hereinbefore described driving mechanism may be connected thereto as shown in Figure 2. The lifting assembly includes a transverse shaft 31 which extends across the frame 12 and which has its ends journaled within suitable bearing collars 32 secured to the upper surface of said frame. A short arm 33 is carried by the central portion of the shaft 31 and has its free end pivotally connected to a yoke or lifting fork 34, which in turn has its arms or branches pivoted to the ears 29 by a pair of nuts and bolts 35. Thus, movement of the shaft 31 in a clockwise direction will lower the yoke and driving mechanism (Figure 3), while rotation of said shaft in an opposite direction will raise said elements (Figure 4). It is pointed out that only the forward end of the driving mechanism will be raised or lowered and that the rear end thereof will pivot or swing upon the axle 14. For operating the lifting mechanism, a radially-extending lever 36 is secured to one end of the shaft 31 and is provided with a suitable pawl member 37 for engaging the teeth of a ratchet 38 carried by the frame 12 as shown in Figure 1. Obviously, when the lever 36 is swung forwardly, the driving mechanism will be pivoted downwardly and rearward movement of said lever will swing said mechanism upwardly.

As is clearly shown in Figure 5, a suitable gear box or casing 39 is preferably made integral with the central portion of the floating housing 25 and is provided with a rearwardly directed extension 40. The shaft 22 extends through the box 39 and has its innermost end journaled within the right-hand wall of said box as shown at 41. A bevelled pinion or gear 42 is mounted on the shaft 22 within the gear box and is arranged to engage a complementary pinion 43 which is secured to the forward end of a longitudinal shaft 44. The latter is mounted for rotation within the rearwardly-projecting extension 40 of the gear box and, since the teeth of the pinion 43 mesh with and are in constant engagement with the teeth of the pinion 42, it is readily apparent that rotation of the shaft 22 in a clockwise direction will rotate this shaft in a clockwise or the same direction (Figure 5).

For supporting the rear end of the gear box 39, a lug or ear 45 is formed on the upper surface of the extension 40 thereof and is adapted to be engaged by a hook 46 which depends from an angular bracket 47 fastened to the arms of the yoke 34. The hook 46 is elongated and has its upper end extending through and slidably connected to the bracket 47 by a retaining nut 48 screw-threaded thereupon. A coiled or helical spring 49 is confined upon the hook between the bracket and an annular flange 50 formed adjacent the lower end of said hook and constantly exerts its pressure to urge the rear portion of the gear box downwardly away from the lifting yoke. The hook may be held in engagement with the lug 45 by a suitable cotter key 51. It is pointed out that since the box 39 is connected to the housing 25 and the yoke 34, it will be raised and lowered with the driving mechanism. It is also pointed out that this arrangement provides a floating or resilient mounting for the gear box and, especially for its rearward extension 40.

A revolving chopper or cutter 52, having a plurality of angular cutting elements 53 and an annular hub 54, is carried by the rear end of the shaft 44, as shown in Figures 8 and 9. The chopper is secured to the shaft by a cylindrical pin or key 55 which extends through a diametric opening 56 formed in said shaft and engages within complementary openings in the hub 54, whereby said chopper is rotated whenever the shaft is turned. The hub includes an annular forward plate 57, an intermediate annular plate 58 and a complementary rear plate 59. Equi-spaced, radial lugs 60 are made integral with the outer periphery of the plate 57 and are arranged to engage beneath forwardly-projecting, complementary keepers 61 carried by the plate 58, whereby said plates may be fastened together. The plate 59 is fastened to the intermediate plate by means of bolts 62 which extend through said rear plate and engage within screw-threaded openings formed in the other plate (Figure 9).

For releasably locking the plates 57 and 58 together, by means of the lugs and keepers, a plurality of recesses 63 are formed in the inner surface of the former plate, such recesses being provided by forming bosses on the plate, as is clearly shown in Figure 7. The plate 58 is of sufficient thickness to permit shallow grooves or depressions 64 to be formed in the surface adjacent the plate 57 and said grooves are complementary to the recesses in said plate. The recesses 63 and grooves 64 are arcuate in cross-section and are arranged to receive short, helical or coiled springs 65 which are secured to one end of their respective recesses, as shown in Figures 7 and 8. A projection 66 is provided at one end of each groove and extends forwardly into the alined recess so as to be engaged by the unattached or free end of the spring 65. With the lugs 60 positioned beneath the keepers 61, a counter-clockwise movement of the plate 58, independently of the plate 57, is normally prevented because of the engagement between the projections 66 and springs 65, the tension of said springs holding the plates in their same relative positions.

To prevent independent movement of the plate in an opposite direction, an angular latch 67 is pivotally secured to a substantially tangential arm 68 mounted on the plate 57 adjacent one of the lugs thereof. The latch is held in operating position by a flat spring 69 which is fastened to the periphery of the forward plate and which has its free end bent outwardly to engage the pivoted end of said latch. With the plates in the position shown in Figure 8, the free end of the latch engages one of the keepers 61 to prevent independent clockwise rotation of the intermediate plate. Movement of the plate 57 in a clockwise direction, while the plate 58 is being held stationary, will cause the projections 66 to compress the spring 65, whereby the lugs 60 will move from beneath the keepers 61 and permit separation of said plates. Thus, it is apparent that the pressure of the springs co-acts with the latch to hold the plates locked together.

A plurality of semi-cylindrical grooves or recesses 70 are formed in the contiguous faces of the rear and intermediate plates 58 and 59. These grooves extend substantially at a tangent to the periphery of their respective plate and complement each other, when the plates are fastened together, to provide sockets for receiving tubular sleeves or collars 71, as shown in Figures 9 and 10. The reduced shank 72 of each cutting element 53 engages within and is welded or otherwise secured to one of the sleeves 71, as is clearly shown in Figure 13, whereby when the sleeves are clamped within the sockets, said elements are fastened to the hub 54.

Each cutting element includes a substantially flat arm 73 which is made integral with the shank 72 and which is twisted with relation to said shank as shown at 74. Obviously, the arm projects substantially tangentially from the hub. At the outer end of the arm, the element is bent sharply or acutely upon itself and at substantially a right angle, as indicated at 75, to form a cutting blade 76. This blade is arcuate or curved so as to co-act with the other blades to form an intercepted, circular chopper or cutting device. As is clearly shown in Figure 10, the blade is curved or bent sharply as shown at 77 adjacent the juncture of said blade and arm, which is at the angle 75. The curved portion 77 is also preferably flat in longitudinal section, as indicated at 78 (Figure 11). The remaining portion of the blade extends or is directed at a slight angle toward the rear of the machine (Figure 1), whereby the free end of said blade is in a vertical plane behind the arm 73. The advance or leading edges of each arm and blade are reduced or sharpened to form cutting edges 73a and 76a, respectively, so as to facilitate their entry into the soil or hill being cultivated.

By the particular formation of each cutting element, the pitch of the blade 76 is flattened to the extent that said blade will enter the ground with a true slicing action and pass therethrough with a minimum drag. It is also pointed out that the arm 73 is disposed at such an angle as to co-act with the blade in producing the above cutting action. By reason of the sharp bending of the blade from the arm at 77, a substantially transverse curved cutting edge 79 is provided at the forward end of said blade (Figure 14) and this cutting edge acts to merge the cutting action of the arm with that of the blade as well as providing a slicing entry of said blade into the soil. The formation of the cutting elements and continuity of their cutting edges 73a and 76a is such that, upon revolution of the chopper, a smooth and continuous entry of the said cutting edges is provided and, thus, undue pounding and upheaval of the soil is eliminated.

The free end of one blade terminates short of, and is spaced from the adjacent blade, and the distance or space between the blades determines the width of the uncut swath. By rotating the sleeves 71 within their respective sockets 70, this distance may be varied to control the width of the uncut swath. As the cutting elements are revolved during forward movement of the machine, it will be seen that the curved cutting edge 79 of each blade will contact the earth first and will be followed by the leading edges 76a and 73a of the blade and arm. Since the device is moving forwardly at the same time that the blade is revolving, said blade will enter the row or hill being cultivated at an angle to the longitudinal axis of the row or hill, whereby a slicing action is produced. Of course, the sharpened leading edges of each blade and arm facilitate the entry of the blade, and thus a preliminary shearing is effected. Continued revolution of the cutting elements, as well as continued forward movement of the machine, causes the remainder of the blade to follow through after the leading edges and thereby complete the cutting.

In operation, the driving mechanism with its gear box 39 and the revolving chopper 52 are lowered to the position shown in Figures 1 to 3 by disengaging the pawl member 37 from the teeth of the ratchet 38 and swinging the lever 36 forwardly. This will cause the elements 53 of the chopper to engage and bite into the hill of the row to be cultivated. Forward movement of the crop spacing machine on its wheels 15 will cause transmission of such movement from its axle 14, through the driving mechanism, which has been hereinbefore described and which includes the sprockets 19 and 21, chain 20, shafts 22 and 44 and the pinions 42 and 43, to the revolving chopper so as to rotate the same in a clockwise direction. This revolution of the chopper will continue as long as the machine travels forwardly, whereby the elements 53 of said chopper will enter the ground obliquely to the line of movement of said machine. The portion 78, arm 73 and curved blade 76 of each element will enter the ground with little or no resistance due to the construction thereof and the sharpened edges 79, 73a and 76a so as to create a pulverized condition of the top soil. In cutting or slicing through the earth, the blades will loosen the same and slip therebeneath, thereby permitting said earth to fall behind said blades and produce a desirable and effective mulch. The latter not only retains moisture but also prevents the roots of the plants from being exposed to nature's elements.

In the event one or more of the blades 76 of the chopper encounter and hang upon a substantially immovable obstruction, such as a large rock, tree stump or root, revolution of said chopper will be halted. However, the shaft 44 and the plate 57 of the hub 54 will continue to turn in a clockwise direction, whereby the springs 65 will be compressed between the bosses 66 of the plate 58 and the ends of their recesses 64. Further rotation of the forward plate will move the lugs 60 from beneath the keepers 61, as shown in dotted lines in Figure 8, to permit separation of the plates 58 and 59 from said plate, thereby dropping the revolving chopper to the ground. Thus, whenever revolution of the chopper is stopped in this manner, it will be automatically disconnected from the shaft 44 to prevent irreparable damage to the blades thereof. Obviously, the chopper may be easily and readily refastened in position by one person.

It is pointed out that, although the coiled spring 49 constantly exerts its pressure to urge the chopper downwardly into intimate contact with the ground, it also permits said chopper to swing upwardly in an arc about the shaft 22 whenever the same engages a "highspot" in the hill of the row being cultivated. Thus, a resilient mounting is provided which allows the chopper to follow the contour of the ground, whereby a more efficient operation is had. It is also pointed out that the floating or rotatable mounting of the shaft housing 25 makes the resilient mounting of the chopper possible and also tends to counteract any thrust or torque caused by the forward movement of the machine as a whole. The lifting mechanism is important because it permits the chopper to be lowered and set at the proper elevation for efficient operation and raised to non-cutting position when turning the device around or going to and from the field. It is noted that the coiled springs 65 not only maintain the plates 57 and 58 in connected relation under normal operating conditions, but also absorb shocks incurred by the blades 76 striking the ground or other objects.

It is also noted that the crop spacing machine may be provided with two or more revolving choppers instead of one in order to chop two or more rows at one time. Obviously, a machine having a plurality of revolving choppers would be advantageous when the crop has been sown with a multiple-row planter. It is further noted that the ratio of the various gears controls the revolutions of the chopper and in turn determines the width of the swath cut by each blade of said chopper.

In Figure 15, a modified form of a cutter hub 80 is shown and includes a pair of annular plates 81 which are fastened together by suitable bolts 82. The adjacent faces of the plates are provided with a plurality of tangential grooves or recesses 83, similar to the grooves 70, which form sockets for receiving the sleeves 71 of the cutting elements 53. The hub is arranged to be mounted on the shaft 44 and be secured thereto by a frangible shear pin 84, of wood, brittle alloy or other suitable material. The pin extends through the opening 56 of the shaft and engages within registering openings formed in the annular flange 85 made integral with the forwardmost plate of the hub. In operation, the pin is sheared whenever the cutting blades become hung upon an immovable obstacle and operation may be resumed by replacing said pin.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. In an agricultural machine, a portable support, a chopper revolvably mounted on the support, means carried by said support for revolving the chopper, and a driving connection between said chopper and said means having means for disconnecting the driving connection and the revolving means arranged to be actuated by the chopper whenever revolution of the same is resisted to a predetermined extent so as to permit the complete disconnection of said chopper from the support.

2. In an agricultural machine, a portable support, a chopper revolvably mounted on the support, means carried by said support for revolving the chopper, and means connecting the chopper with the revolving means having provision for automatically and completely disconnecting said chopper whenever revolution of the same is resisted to a predetermined extent so as to permit the chopper to drop from the support.

3. In an agricultural machine, a portable support, a chopper revolvably mounted on the support, means carried by said support for revolving the chopper, and a driving connection between said chopper and said means, the connection having means for completely disconnecting it from the support and the revolving means arranged to be actuated by the chopper whenever revolution of the same is resisted to a predetermined extent, said driving connection also including means connected with the chopper for absorbing shocks encountered by said chopper.

4. In an agricultural machine, a portable support, a chopper revolvably mounted on the support, means carried by said support for revolving the chopper, and means connecting the chopper with the revolving means having provision for automatically and completely disconnecting said chopper from the support whenever revolution of the same is resisted to a predetermined extent, the connecting means including resilient elements connected to the chopper for resisting disconnection of said chopper and for absorbing shocks encountered by the same.

5. In an agricultural machine, a portable support, a revolving chopper, means for pivotally suspending the chopper from the support so that said chopper may move vertically independently of said support, means carried by the support for revolving the chopper, and means connecting said chopper with the revolving means having provision for automatically and completely disconnecting the chopper from the support whenever revolution of the same is resisted to a predetermined extent.

6. In an agricultural machine, a portable support, a longitudinal shaft mounted on the support, means carried by said support for rotating the shaft, means secured to the shaft and rotatable therewith, a chopper element arranged to be detachably connected to the last-named means so as to be revolved upon rotation of said shaft, and co-acting means for detachably connecting the element and rotatable means together, said co-acting means permitting disconnection of said element and rotatable means whenever revolution of the element is resisted to a predetermined extent.

7. In an agricultural machine, a portable support, a longitudinal shaft mounted on the support, means carried by said support for rotating the shaft, a supporting element fixed on the shaft and revolvable therewith, a plate arranged to be detachably connected to the element and having chopper blades extending outwardly therefrom, and yieldable means interposed between the plate and element for normally urging the same toward their connected position, said means functioning to permit disconnection of said plate and element in the event revolution of the plate is resisted to a predetermined extent.

8. In an agricultural machine, a portable support, a longitudinal shaft mounted on the support, means carried by said support for rotating the shaft, a supporting element fixed on the shaft and rotatable therewith, a plate arranged to be connected to the element and having chopper blades extending outwardly therefrom, means on the plate adapted to co-act with said element for detachably connecting said plate thereto, and yieldable means interposed between the element and plate for normally urging the same toward their connected position, said yieldable means functioning to permit disconnection of said element and plate whenever revolution of the plate is resisted to a predetermined extent.

9. In an agricultural machine, a portable support, a longitudinal shaft mounted on the support, means carried by said support for rotating the shaft, a supporting element fixed on the shaft and rotatable therewith, a revolvable chopper arranged to have its hub detachably connected to the element, and yieldable means interposed between the element and chopper hub for normally urging the same toward their connected position and for absorbing shocks encountered by the chopper, said yieldable means permitting complete disconnection of said element and chopper whenever revolution of the latter is resisted to a predetermined extent.

10. In an agricultural machine, a portable support, a longitudinal shaft mounted on the support, means carried by said support for rotating the shaft, a supporting element fixed on the shaft and rotatable therewith, a revolvable hub arranged to be detachably connected to the element and having chopper blades extending outwardly therefrom, and a resilient member interposed between said element and hub for normally urging the same toward their connected position, the member absorbing shocks encountered by the blades of said hub and permitting disconnection of the hub from the element whenever revolution of the former is resisted to a predetermined extent.

LAWRENCE W. LEEPER.